United States Patent Office 3,409,701
Patented Nov. 5, 1968

3,409,701
CATALYST AND METHOD FOR DEHYDROGENATING AND CRACKING ALKANES AND OLEFINS
Charles R. Noddings and Andrew J. Dietzler, Midland, and Ronald G. Gates, Breckenridge, Mich., assignors to The Dow Chemical Company, Midland, Mich., a corporation of Delaware
No Drawing. Continuation-in-part of applications Ser. No. 335,775, Ser. No. 335,784, Ser. No. 335,810, and Ser. No. 335,841, Jan. 6, 1964. This application Dec. 27, 1966, Ser. No. 604,661
5 Claims. (Cl. 260—683)

ABSTRACT OF THE DISCLOSURE

This invention concerns new phosphate catalysts containing nickel or nickel and chromium and a process employing these catalysts for the dehydrogenation and/or cracking of aliphatic hydrocarbons, primarily paraffins and olefins, having three or more carbon atoms in the molecule. It pertains especially to novel catalysts prepared by precipitating nickel with a phosphate ion or coprecipitating chromium and nickel with phosphate ions, the latter coprecipitation being carried out to produce a material having from 6 to 12 atoms of chromium per atom of nickel on one hand or 6 to 12 atoms of nickel per atom of chromium on the other hand.

CROSS-REFERENCE TO RELATED APPLICATIONS

This application is a continuation-in-part of our co-pending applications Ser. No. 335,810, entitled "Nickel Chromium Phosphate Catalyst and Method for Dehydrogenating and Cracking Alkanes and Olefins," filed Jan. 6, 1964, now abandoned; Ser. No. 335,841, entitled, "Nickel Chromium Phosphate Catalyst and Method for Dehydrogenating and Cracking Alkanes and Olefins," filed Jan. 6, 1964, now abandoned; Ser. No. 335,775, entitled, "Nickel Phosphate Catalyst and Method for Dehydrogenating and Cracking Alkanes and Olefins," filed Jan. 6, 1964, now abandoned; and Ser. No. 335,784, entitled "Chromium Nickel Phosphate Catalyst and Method for Dehydrogenating and Cracking Alkanes and Olefins," filed Jan. 6, 1964, now abandoned.

BACKGROUND OF INVENTION

It is, of course, well known that aliphatic hydrocarbons, e.g., petroleum fractions (mixed hydrocarbons) or individual paraffins or olefins, can be pyrolyzed to obtain a mixture of products comprising a small, though appreciable, proportion of conjugated diolefins and a larger proportion of shorter chain length unsaturated products. During such pyrolysis, it has been observed that several different kinds of reactions usually occur simultaneously, e.g. (1) dehydrogenation, (2) cracking of the carbon-to-carbon linkages in the molecule to form products containing fewer carbon atoms per molecule than the original hydrocarbon, and (3) polymerization of unsaturated hydrocarbons, so that the product is, in most instances, a hydrocarbon mixture. An example of such products is cracked-oil gas, containing paraffinic hydrocarbons ranging in chain length from methane to hexane, olefins ranging in chain length from ethylene to hexylene, and a small amount, usually less than 10%, of less saturated hydrocarbons such as butadiene, isoprene, piperylene and acetylenic hydrocarbons. The difficulties involved in recovering the more useful products from such mixture add greatly to their cost.

It is an object of this invention to provide a catalyst for the dehydrogenation and/or cracking of $C_3$ and higher hydrocarbons, and particularly $C_4$ and higher hydrocarbons. Another object of the present invention is to provide a method wherein the new catalyst will produce useful organic products (that is products other than $CO_2$, carbon and hydrogen) from the pyrolysis, (i.e., cracking and/or dehydrogenation) in quantities which increase the economical value of the starting carbon compounds. A further object is to provide a set of operating conditions under which the new catalysts may effectively be used for the foregoing purposes. Other objects will be apparent from the following description of the invention.

SUMMARY OF INVENTION

We have found that a nickel phosphate, chromium-nickel phosphate containing an average of between 6 and 12 and preferably from about 6 to about 9 atoms of chromium per atom of nickel or nickel-chromium phosphate containing an average of between 6 to 12 atoms and preferably 6 to about 9 atoms of nickel per atom of chromium, and each of which is precipitated under a pH from 4 to about 10 is, under certain operating conditions, effective in catalyzing the thermal dehydrogenation and/or cracking of $C_3$ and higher hydrocarbons, and particularly $C_4$ and higher hydrocarbons, to $C_2$ and $C_3$ hydrocarbons, containing a high proportion of olefins.

DESCRIPTION OF THE PREFERRED EMBODIMENTS

The catalysts are prepared by mixing together water-soluble salts of nickel and/or chromium in the appropriate ratios, with a water-soluble source of the orthophosphate ion ($PO_4^\equiv$) in an aqueous medium under conditions such that the pH is within the range specified above for the particular embodiment. Material of good catalytic quality is obtained when a two metal phosphate, that is when the chromium and nickel are employed to provide from 6 to 12 moles of chromium per mole of nickel or nickel per mole of chromium. Further, while not critical but desirable, the phosphate moiety is employed in a slight excess over that which is theoretically necessary to combine with the metal ions to form a metal orthophosphate. It is to be understood that the pH may, but does not have to be maintained at that which produces the catalytically operative material during mixing but can be adjusted, after mixing and precipitation, but before settling, by addition of a base or acid as necessary to the reaction mixture to bring the solution within the desired range of pH set forth for preparation of a material capable of catalytically dehydrogenating and/or cracking hydrocarbons.

The contacting and mixing of the reactants in accordance with the above recitation can be carried out in several manners, such as simultaneously, stepwise or intermittently, each in either a batchwise or continuous manner.

Examples of salts which may be used as starting materials in preparing the catalyst are the chlorides, bromides, nitrates, and acetates, etc., of chromium and nickel. Examples of water-soluble phosphates that may be employed as starting materials are phosphoric acid, disodium phosphate, trisodium phosphate, dipotassium phosphate, a diammonium phosphate, etc.

The catalyst can also be prepared in either a batchwise manner or a continuous manner by feeding separate streams of:

(1) A base, preferably aqueous ammonia and in the case of nickel phosphate, some ammonium ion must be present, although other bases can be employed when preparing the double metal salts, as well as mixtures of two or more different bases;

either a single or as separate streams (2) An aqueous solution of nickel or chorimum and nickel salts (in relative proportions corresponding to between 6 and 12 and preferably about 6 to 9 atoms of chromium per atom of nickel or between 6 and 12 and preferably 6 to 9 atoms of nickel per atom of chromium;

and either a separate or as a part of any one of the aforesaid streams (3) A dissolved orthophosphate, into a reaction chamber. The relative rates of flow are adjusted so that the resultant mixture will achieve, continuously or upon completion of the mixing, a pH of 4 to 10 when a dehydrogenation catalyst is desired of the chromium-nickel class, 7 to 10 when the nicked-chromium class is produced, 4–9 when $Ni/PO_4$ class is produced, and 5 to 7 when a cracking catalyst of the nickel-chromium class is desired. It is desirable to retain within the reaction zone a portion of the precipitated phosphate which forms, this then being blended with succeeding portions or batches. This is conveniently achieved by adjusting the outflow of the precipitated phosphate to retain a portion of the flocculent material in the reaction vessel. The reaction mixture, or preferably the settled lower layer thereof, may be filtered to obtain a filter cake which contains 2 to 10% or more, usually about 22% of the precipitated phosphate.

The phosphate precipitated from a mixture of higher pH value which is then adjusted to the pH above set forth for the particular catalyst is of good catalytic activity, but is extremely slow in settling. The phosphate precipitated from a mixture of pH value below 4 settles rapidly, but is less active as a catalyst for the cracking and dehydrogenation of $C_4$ hydrocarbons than is phosphate precipitated from mixtures within the range of pH values set forth.

Usually water is employed as the solvent for the starting materials, but other ionizing solvents, e.g., aqueous alcohol, may in some instances be used.

In any event after the reaction is complete and the desired pH obtained the precipitate is separated from the liquor by filtration or decantation and is washed with water decanting or filtering after each washing. The washing should be carried out so as to remove as thoroughly as possible readily soluble compounds from the product, since such impurities have a disturbing and erratic action on the thermal decomposition of hydrocarbons. Of particular attention are the unreacted chlorides or byproduct chlorides which, if retained in the catalyst, tend to deactivate the latter. The catalyst is, at this stage in its preparation, a solid or gel-like substance which is apparently amorphous.

After being washed with water, the product is dried, usually at temperatures between 60° and 150° C. The dried product is a hard gel usually of greenish color. The gel may be crushed or otherwise reduced to granules, or small lumps, and be used directly as a dehydrogenation catalyst. However, it is preferably pulverized, e.g., to a particle size capable of passing a 28-mesh screen, and the powdered product is treated with a lubricant and is pressed into the form of pills, tablets, or granules of size suitable for use as a catalyst, e.g., into the form of tablets of from $\frac{1}{16}$ to $\frac{1}{2}$ inch diameter. The lubricant serves to lubricate the particles during the operation of pressing them into pills and its use permits the formation of pills of greater strength and durability than are otherwise obtained. As the lubricant we preferably use a substance capable of being removed by vaporization or oxidation from the product, e.g., a substance such as graphite, a vegetable oil, or a hydrocarbon oil, etc.

$C_4$ and higher hydrocarbons can be cracked and/or dehydrogenated in the presence of steam and the catalysts of the present invention at temperatures between 600° and 750° C., and in some instances at temperatures as much as 50° C. below or above this range. The reaction is advantageously carried out at temperatures between 650° and 700° C.

Except for the foregoing limitations, the conditions under which the dehydrogenation reaction is carried out may be varied widely. Also, the method is operable at atmospheric, subatmospheric, or at superatmospheric pressures, provided the hydrocarbon reactant is in vaporized form. In some instances, the yield of dehydrogenated product decreases upon increase of the reaction pressure above atmospheric. However, the ability to operate at an increased pressure is of considerable advantage, since condensation of the reaction products may thereby be facilitated. In general, the proportion of hydrocarbon reacted and also the amount of byproduct formation per pass through the catalyst bed tend to decrease with increase in the rate of vapor flow, and vice-versa.

In producing cracked and dehydrogenated hydrocarbon products in accordance with the invention, a reaction chamber is charged with the catalyst and the lubricant, if employed, is removed from the catalyst. This is usually accomplished by passing an $O_2$-containing gas such as oxygen or air, preferably a mixture of about equal volumes of air and steam, through the catalyst bed at a high temperature, e.g., 450° to 750° C. When the lubricant used in preparing the catalyst granules is a substance capable of being vaporized, e.g., a mineral or vegetable oil, the step of treating the catalyst with air may be preceded by one of passing an inert gas or vapor such as steam, nitrogen, or carbon dioxide over the catalyst so as to vaporize at least a portion of the binding agent from the catalyst granules.

After freeing the catalyst of the lubricant, the catalyst bed is swept free of the $O_2$ or air with steam and is heated to the desired reaction temperature, preferably by passing superheated steam through the same. A mixture of steam and the hydrocarbon reactant, e.g., propane, butylene, amylene, hexylene, butane, pentane, or hexane, having at least three carbon atoms, is then passed through the catalyst bed at a temperature between 600° and 900° C., and preferably between 650° and 700° C. The usual procedure is to pass the hydrocarbon gas into admixture with steam which has been superheated to 750° C. or above, i.e., to a temperature sufficient so that the resultant mixture is at the desired reaction temperature, and to pass the mixture through the bed of catalyst. However, the heat may be supplied in other ways, e.g., by forming the steam and hydrocarbon mixture at a lower temperature and passing the mixture through a preheater to bring it to the desired temperature, or by externally heating the catalyst chamber itself. The yield of olefins is usually highest when from 10 to 20 volumes of steam are employed per volume of the gaseous or vaporized hydrocarbon, but the steam may be used in smaller or larger proportions if desired. As hereinbefore mentioned, the rate of vapor flow through the catalyst chamber may be varied widely, but in practice the flow usually corresponds to between 100 and 700 liters of the hydrocarbon (expressed as at 0° C. and 760 millimeters' pressure) per liter of catalyst bed per hour.

The vapors issuing from the catalyst chamber are ordinarily passed through heat exchangers to condense first the water and then the hydrocarbon products. By repeatedly recycling the unreacted hydrocarbons, a cracked or dehydrogenated product may be produced in a 60 percent yield or higher and usually in a yield of from 70 to 75 percent of theoretical or higher.

During use in the process, the catalyst gradually accumulates a small amount of carbon, or nonvolatile organic material, and loses its activity. Accordingly, flow of the hydrocarbon starting material is periodically interrupted and air, admixed with steam, is blown through the catalyst bed, e.g., at temperatures between 450° and 700° C., and preferably at the hydrocarbon reaction temperature, to oxidize and remove the carbonaceous material and thus reactivate the catalyst. Usually from 10 to 30 minutes are required to carry out this reactivation step. However, if, during compounding of the catalyst into tablet form, an agent having the property of catalyzing the oxidation of carbon is admixed therewith, the time subsequently required for reactivating the catalyst with steam and air may be reduced markedly. For instance, the incorporation of one or two percent by weight of chromic oxide in the catalyst tablets facilitates reactivation of the catalyst. Other agents having the property of catalyzing the burning of carbon are known to the art.

After completing the reactivation step, the catalyst chamber is again swept free of air with steam and the introduction of hydrocarbons, together with the steam, is resumed. Usually, reactivation of a catalyst is advisable after from 15 to 60 minutes of use in the dehydrogenation reaction. In practice, two or more catalyst chambers are preferably employed in a system provided with connections for passing the reaction mixture alternately through different catalyst beds. One catalyst bed is usually employed in the reaction while another is being reactivated. By operating in this manner, the reaction may be carried out continuously.

The following examples illustrate the present invention, but are not to be construed as limiting:

Example 1

Chromium chloride, 14.3 gram-moles, as an 11.5 weight percent aqueous solution thereof was mixed in a vessel with 2.38 gram-moles of nickel chloride as a 29 weight percent aqeuous solution and 16.3 gram-moles of phosphoric acid as a 71 weight percent aqueous solution and the resulting mixture was diluted with water to a total volume of 80 gallons. Upon completion of the addition of the above enumerated chemicals to the vessel reactor, 49.1 grams of an aqueous 14.7 weight percent ammonium hydroxide solution was slowly added with stirring over 2.5 hours of reaction at which time the pH remained constant at 4.5. The reaction was considered complete when the pH remained constant. Thereafter, the reaction mass was allowed to settle overnight, after which the supernatant liqiud was drawn off (approximately 58 gallons decanted) and the resulting thick slurry filtered and washed with water. The filtrate was discarded. In this specific instance the slurry was washed by decantation with water 14 times until chloride free, then removed and dried at 100° C. in a rotary drier. The dry powder was recovered to the extent of 78% of the theoretical yield, based on the starting materials used, and was crushed, mixed with about 2% of a lubricant grade graphite and expressed into pellets about ¼ inch in diameter and ¼ inch long. The graphite was burned off by treating with air and steam at about 650° C. for about 6 hours. The resulting catalyst pellets were tested as dehydrogenation and cracking catalyst at 700° C., 150 v./v./hr. (volumes of gas per unit volume of catalyst per hour) (S.T.P.) of 99% ni-butane, 1500 v./v./hr. or 3000 v./v./hr. of steam and 0.5 hr. of 1.0 hr. cycle, half of which was regeneration of catalyst accomplished by passing 400 or 85 v./v./hr. of air and 1500 or 3000 v./v./hr. of steam, respectively, at the reaction temperature. The results set forth in the following table are all based on the carbon content of the amount of butane converted.

| Catalyst, chromium to nickel ratio | 6/1 | 6/1 | 6/1 |
|---|---|---|---|
| pH of precipitation | 4.5 | 4.5 | 6.0 |
| V./v./hr. steam | 1,500 | 3,000 | 3,000 |
| Cycle, hours | 0.5 | 1.0 | 1.0 |
| Product Data: | | | |
| Percent Conversion | 34 | 23 | 23 |
| Percent Yield C₂H₄ and C₃H₆ | 59 | 61 | 60 |
| Percent Yield 1-C₄H₈ | 5.5 | 10 | 3.5 |
| Percent Yield 2-C₄H₈ | 4.5 | ---- | 3 |
| Percent Yield 1,3—C₄H₆ | 17.5 | 16 | 19.5 |

Example 2

In a like manner employing the same catalyst, as well as one prepared in a similar manner but having a Cr/Ni ratio of 9 and feeding 99% butene at 650° C., 300 v./v./hr. (S.T.P.) and 6000 v./v./hr. of steam and 1 hour cycles there was obtained the following results:

| Cr/Ni ratio | 6/1 | 9/1 |
|---|---|---|
| pH | 4.5 | 4.5 |
| Product Data: | | |
| Percent Conversion | 17.5 | 13 |
| Percent Yield, 1,3-C₄H₆ | 93.5 | 86.5 |

Example 3

Employing 92% propylene and steam at the same rate as butene and steam and the 6/1 Cr/Ni catalyst used in Example 2 above, at 825° C., there was obtained a 57% conversion of propylene fed. The yield of desirable products based on propylene consumed was 42% ethylene, 18.5% propadiene, 8.5% acetylene and 6.5% butadiene.

Examples 4–6

Nickel chloride, 15 gram-moles, at 22 weight percent aqueous solution thereof was mixed in a vessel with 10.3 gram-moles of phosphoric acid as a 75.5 weight percent aqueous solution and the resulting mixture was diluted with water to a total volume of 65 gallons. Upon completion of the addition of the above enumerated chemicals to the vessel reactor, 43.3 gram-moles of an aqueous 13.6 weight percent ammonium hydroxide solution was slowly added while continuously stirring the reaction mass over 2.3 hours until the pH of the reaction mass remained constant. The final pH remained at a constant value of 7.8. Thereafter, the reaction mass was allowed to settle overnight after which the supernatant liquid was drawn off (approx. 60 gallons decanted) and the resulting thick slurry filtered and washed with water. The filtrate was discarded. In the specific instance, the slurry was washed by decantation with water 3 times until chloride free, then removed and dried at 100° C. in a rotary drier. The dry powder was recovered to the extent of 99% of the theoretical yield, based on the starting materials used, and was crushed, mixed with about 2% by weight of a lubricant grade graphite and expressed into pellets about ¼ inch in diameter and ¼ inch long. The graphite was burned off by treating the pellets with air and steam at about 650° C. for about six hours. The resulting catalyst pellets were tested as cracking or dehydrogenation catalyst with 99% n-butane or 99% butene, steam and 1.0 hr. cycles. The results of such operations are set forth in the following table. All yields are based on the carbon content of the amount of hydrocarbon converted. The various catalysts were prepared in the same manner as set forth above with adjustment in the amount of ammonia only to obtain the stated pH of precipitation. Regeneration of catalyst beds was for 30 minutes duration of the 1.0 hr. cycles using 680 v./v./hr. air and 6000 v./v./hr. steam for n-butene and 85 v./v./hr. air and 3000 v./v./hr. steam for n-butane at 1 atm. pressure.

|  | Example No. | | | | | |
|---|---|---|---|---|---|---|
|  | 4 | | 5 | | 6 | |
|  | pH of Precipitation | | | | | |
|  | 6.0 | | 7.8 | | 8.5 | |
|  | Dry powder, percent recovery | | | | | |
|  | 74 | | 99 | | 115 | |
| Feedstock | $C_4H_{10}$ | $C_4H_8$-1 | $C_4H_{10}$ | $C_4H_8$-1 | $C_4H_{10}$ | $C_4H_8$-1 |
| V./v./hour (S.T.P.) feedstock | 150 | 300 | 150 | 150 | 150 | 150 |
| V./v./hour (S.T.P.) steam | 3,000 | 6,000 | 3,000 | 3,000 | 3,000 | 3,000 |
| Temperature, °C | 700 | 650 | 700 | 700 | 700 | 690 |
| Product Data: | | | | | | |
| Percent conversion | 18.5 | 23 | 23.5 | 45.5 | 19.5 | 42.5 |
| Percent yield butene-1 | 7.5 |  | 7 |  | 7.5 |  |
| Percent yield butene-2 | 9 |  | 5.5 |  | 11 |  |
| Percent yield butadiene | 24 | 93.5 | 15 | 87.5 | 19 | 89.5 |
| Percent yield $C_2H_4$ | 22.5 |  | 28.5 |  | 23 |  |
| Percent yield $C_3H_6$ | 25.5 |  | 27.5 |  | 25.5 |  |

In comparison, pure $Ni_3(PO)_2$ made using NaOH instead of $NH_4OH$ degraded butene-1 to $CO_2$ and $H_2$ at 600° C. However, replacement of 10, 25 and up to 50% of the $NH_4OH$ used in the foregoing examples with NaOH, results in catalyst of comparable quality to that shown in the table.

Example 7

Nickel chloride, 21 gram-moles, as an 8 weight percent aqueous solution thereof, was mixed in a vessel with 3.48 gram-moles of chromium chloride as a 26.7 weight percent aqueous solution and 17.9 gram moles of phosphoric acid as a 75.5 weight percent aqueous solution and the resulting mixture is diluted with water to a total volume of 105 gallons. Upon completion of the addition of the above enumerated chemicals to the vessel reactor, 53.8 gram-moles of an aqueous 13.4 weight percent ammonium hydroxide solution was slowly added while continuously stirring the reaction mass over 2.5 hours of reaction at which time the reaction was considered complete as the pH remained constant at 5.7. Thereafter the reaction mass was allowed to settle overnight after which the supernatant liquid was drawn off (approximately 61 gallons decanted) and the resulting thick slurry filtered and washed with water. The filtrate was discarded. In the specific instance the slurry was washed by decantation with water 13 times until chloride free, then removed and dried at 100° C. in a rotary drier. The dry powder was recovered to the extent of 57 percent of the theoretical yield, based on the starting materials used, and was crushed, mixed with about 2 percent of lubricant grade graphite, and expressed into pellets about ¼ inch in diameter and ¼ inch long. The graphite was burned off by treating the pellets with air and steam at about 650° C. for about 6 hours. The resulting catalyst pellets were treated in a steam atmosphere for 24 hours at 700° C. and then were tested as cracking catalyst at 650° C., 15 v./v./hr. with 99% n-butane, 3000 v./v./hr. of steam and 1 hr. cycle, 50% of which was regeneration using 85 v./v./hr. of air and 3000 v./v./hr. of steam at the reaction temperature. There was obtained a yield of 82% of $C_3H_6$ and 18% yield of $CH_4$ based on the carbon content of the amount of butane converted (91% per pass).

Example 8

A catalyst was prepared in a similar manner to Exaxmple 1 except the mole ratio of nickel to chromium was 9 to 1 and the final pH was 5.8. 70 percent of theoretical yield was obtained as a dry powder. After being pelletized, the catalyst was employed in the test procedure outlined in Example 7 to obtain a 76.3% conversion of butane fed and an 81% yield of $C_3H_6$ and 19% yield of methane.

Examples 9–11

Nickel chloride, 21 gram-moles, as an 8 weight percent aqueous solution thereof was mixed in a vessel with 3.48 gram-moles of chromium chloride as a 26.7 weight percent aqueous solution and 17.9 gram moles of phosphoric acid as a 75.5 weight percent aqueous solution and the resulting mixture was diluted with water to a total volume of 105 gallons. Upon completion of the addition of the above enumerated chemicals to the vessel reactor, 91.4 gram-moles of an aqueous 13.4 weight percent ammonium hydroxide solution was slowly added over 2.5 hours with continuous stirring of the reaction mass. The reaction was considered complete when the pH remained constant at 8.3. Thereafter the reaction mass was allowed to settle overnight after which the supernatant liquid was drawn off (approximately 76 gallons decanted) and the resulting thick slurry filtered and washed with water. The filtrate was discarded. In the specific instance the slurry was washed by decantation with water 12 times until chloride free, then removed and dried at 100° C. in a rotary drier. The dry powder was recovered to the extent of 93% of the theoretical yield, based on the starting materials used, and was crushed, mixed with 2% by weight of a lubricant grade graphite and expressed into pellets about ¼ inch in diameter and ¼ inch long. The graphite was burned off by treating the pellets with air and steam at about 650° C. for about 6 hours. The resulting catalyst pellets were tested as cracking and dehydrogenation catalyst at the temperature, feed name, and at the feed rates set forth below.

|  | Example No. | | | |
|---|---|---|---|---|
|  | 9 | 10 | 11 | 12 |
| Feed | $C_4H_{10}$ | $C_4H_{10}$ [1] | 99% [1] $C_4H_8$ | 92% [1] $C_3H_6$ |
| V./v./hr. feed | 150 | 150 | 300 | 300 |
| V./v./hr. steam | 3,000 | 3,000 | 6,000 | 6,000 |
| Temp. °C | 640 | 700 | 650 | 800 |
| Cycle time hr.[2] | 0.5 | 1.0 | 1.0 | 1.0 |
| Product: | | | | |
| Percent conversion | 19 | 24 | 22 | 80 |
| Percent yield $C_2H_4+C_3H_6$ | 10 | 54.5 |  |  |
| Percent yield $C_4H_8$-1 | 21.5 | 28.5 |  |  |
| Percent yield $C_4H_8$-2 | 25 | 28.5 |  |  |
| Percent yield 1,3-$C_4H_6$ | 38 | 28.5 | 95.5 | 2.5 |
| Percent yield $C_2H_4$ |  |  |  | 35 |
| Percent yield $C_2H_2$ |  |  |  | 7 |
| Percent yield $C_3H_4$ |  |  |  | 8.5 |

[1] Catalyst was prepared with nickel to chromium ratio of 9 to 1, and otherwise catalytic preparation the same as set forth.
[2] Half cycle time with both hydrocarbon and steam followed by half time on steam and air. Regeneration air was 400 v./v./hr. for $C_4H_{10}$ run and 680 v./v./hr. for other two.

All yields are based on the carbon content of the amount of hydrocarbon converted.

We claim:

1. The method which comprises dehydrogenating and/or cracking an aliphatic hydrocarbon having at least 3 carbon atoms by passing the hydrocarbon together with steam at a temperature between 600° and 750° C. in contact with a catalyst composed of a metal phosphate material consisting essentially of phosphate radicals chemically combined with chromium and nickel in the relative proportions of between $\frac{1}{12}$ to $\frac{1}{6}$ and 6 to 12 atoms of chromium per atom of nickel which metal phosphate material is preparable by mixing a solution of soluble salts of chromium and nickel with a soluble source of orthophosphate ions and precipitating in the gel form said metal phosphate material from the mixture at a pH of between about 4 to 10.

2. The method of claim 1 which comprises passing hydrocarbon vapors containing butane and between 10 and 20 volumes of steam per volume of hydrocarbon into contact with the catalyst.

3. The method which comprises cracking a saturated aliphatic hydrocarbon having at least 4 carbon atoms by passing the hydrocarbon together with steam at a temperature between 600° and 750° C. in contact with a catalyst composed of a metal phosphate material consisting essentially of phosphate radicals chemically combined with nickel and chromium in the relative proportions of between 6 and 12 atoms of nickel per atom of chromium which metal phosphate material is preparable by mixing a solution of soluble salts of nickel and chromium with a soluble source of orthophosphate ion and precipitating in the gel form said metal phosphate material from the mixture at a pH of between about 5 to 7.

4. The method of claim 3 which comprises passing hydrocarbon vapors containing a paraffin having 4 carbon atoms and between 10 and 20 volumes of steam per volume of hydrocarbon into contact with the catalyst.

5. A metal phosphate material prepared by precipitation in the gel form from a solution of a water soluble chromium salt, a water soluble nickel salt, and a soluble source of phosphate ion, said metal phosphate material being precipitated at a pH of about 4 to about 10 when it contains between about 6 and 12 atoms of chromium per atom of nickel and being precipitated at a pH of about 5 to 10 when it contains 6 to 12 atoms of nickel per atom of chromium.

References Cited

UNITED STATES PATENTS

| | | | |
|---|---|---|---|
| 2,442,320 | 5/1948 | Britton et al. | 260—680 |
| 2,478,464 | 8/1949 | Denton et al. | 260—465 |
| 2,542,813 | 2/1951 | Heath | 252—437 |
| 3,092,674 | 6/1963 | Bray et al. | 260—680 |
| 3,205,181 | 9/1965 | Bowman et al. | 252—437 |

FOREIGN PATENTS

| | | |
|---|---|---|
| 1,056,104 | 10/1959 | Germany. |

OTHER REFERENCES

Chemical Abstracts, vol. 58, 7769f, 1963 (abstracts of Shvikin et al., Catalytic Dehydrogenation of Petroleum Methyl Cycopentane, Neftekhimiya, vol. 2, pages 473–9 (1962).

Mellor: "A Comprehensive Treatise on Inorganic and Theoretical Chemistry," vol. 15, pages 494–5, Longmans, Green and Co., N.Y., 1936.

Nesse et al. "Journal of the American Chemical Society," vol. 74, pages 4685–88 (1952).

DELBERT E. GANTZ, *Primary Examiner.*

C. E. SPRESSER, JR., *Assistant Examiner.*